(12) United States Patent
Takemoto et al.

(10) Patent No.: US 9,903,789 B2
(45) Date of Patent: Feb. 27, 2018

(54) PRESSURE SENSOR

(71) Applicant: TOYOTA JIDOSHA KABUSHIKI KAISHA, Toyota-shi, Aichi-ken (JP)

(72) Inventors: Yoshiharu Takemoto, Toyota (JP); Yuji Nishibe, Nagakute (JP); Kentaro Mizuno, Nagakute (JP); Shoji Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 14/883,028

(22) Filed: Oct. 14, 2015

(65) Prior Publication Data

US 2016/0238485 A1    Aug. 18, 2016

(30) Foreign Application Priority Data

Feb. 17, 2015   (JP) ................................ 2015-028772

(51) Int. Cl.
| | |
|---|---|
| *G01M 15/08* | (2006.01) |
| *G01L 9/00* | (2006.01) |
| *G01L 9/08* | (2006.01) |
| *G01L 19/04* | (2006.01) |
| *G01L 23/10* | (2006.01) |

(52) U.S. Cl.
CPC ............ *G01M 15/08* (2013.01); *G01L 9/0054* (2013.01); *G01L 9/085* (2013.01); *G01L 19/04* (2013.01); *G01L 23/10* (2013.01)

(58) Field of Classification Search
CPC ....... G01L 19/04; G01L 23/10; G01L 9/0054; G01L 9/085; G01M 15/08
See application file for complete search history.

(56) References Cited

U.S. PATENT DOCUMENTS

| | | | |
|---|---|---|---|
| 5,349,873 A | 9/1994 | Omura et al. | |
| 6,023,978 A | 2/2000 | Dauenhauer et al. | |
| 6,247,369 B1* | 6/2001 | Chapman | G01L 9/0054 73/726 |
| 6,843,132 B2* | 1/2005 | Mizuno | G01L 23/18 73/700 |

(Continued)

FOREIGN PATENT DOCUMENTS

| | | |
|---|---|---|
| JP | H06-34455 A | 2/1994 |
| JP | H11-153503 A | 6/1999 |

(Continued)

*Primary Examiner* — Freddie Kirkland, III
(74) *Attorney, Agent, or Firm* — Oliff PLC

(57) ABSTRACT

A pressure sensor includes a diaphragm, a coupling portion coupled to the diaphragm, and two pressure receiving elements. Each pressure receiving element outputs an output signal that changes according to the temperature and the pressure applied to a pressure receiving surface and has an output characteristic that represents the relationship of the output signal to the pressure and the temperature. The two pressure receiving elements have the same output characteristics. The pressure receiving surface of one of the two pressure receiving elements is connected to the diaphragm through the coupling portion, and the pressure receiving surface of the other pressure receiving element is disconnected from the diaphragm. The pressure sensor outputs a signal that is in accordance with the difference between voltages of the two pressure receiving elements.

10 Claims, 4 Drawing Sheets

(56) References Cited

U.S. PATENT DOCUMENTS

| | | | |
|---|---|---|---|
| 8,631,707 B2* | 1/2014 | Kurtz | G01L 9/0055 29/592.1 |
| 9,103,738 B2* | 8/2015 | Barron | G01L 9/125 |
| 2004/0231425 A1 | 11/2004 | Mizuno et al. | |
| 2011/0239772 A1 | 10/2011 | Kurtz et al. | |

FOREIGN PATENT DOCUMENTS

| | | |
|---|---|---|
| JP | 3166015 B2 | 5/2001 |
| JP | 2001-511884 A | 8/2001 |
| JP | 2004-347387 A | 12/2004 |
| JP | 2011-027611 A | 2/2011 |
| JP | 4638659 B2 | 2/2011 |
| JP | 2013-164332 A | 8/2013 |

* cited by examiner

US 9,903,789 B2

PRESSURE SENSOR

BACKGROUND OF THE INVENTION

The present invention relates to a pressure sensor that detects a pressure.

Japanese Laid-Open Patent Publication No. 6-34455 describes a pressure sensor that includes a diaphragm, a force transducer, and a force transmission block. The force transducer outputs an output signal that changes according to a pressure. The force transmission block is coupled to the force transducer. The pressure sensor detects the pressure applied to the diaphragm by transmitting the pressure to the force transducer through the force transmission block.

The output signal of the force transducer of the pressure sensor changes according to the temperature as well as the pressure. That is, even when the pressure transmitted to the force transducer is constant, changes in the temperature change the output signal. Thus, the pressure sensor of the above publication performs a temperature compensation operation on the output signal of the force transducer to eliminate the influence of the temperature. The pressure is detected based on the output after the operation.

The pressure sensor described above pre-stores a compensation factor for the temperature compensation operation. Force transducers vary in output characteristics. In order to accurately correct the change in the output signal of each element caused by a change in temperature, the pressure sensor needs to store a compensation factor that is determined in accordance with the output characteristic of the element. This may increase the manufacturing steps of the pressure sensor and the manufacturing costs.

SUMMARY OF THE INVENTION

It is an objective of the present invention to provide a pressure sensor that detects a pressure without storing a compensation factor that is determined according to the output characteristic of each element.

To achieve the foregoing objective and in accordance with one aspect of the present invention, a pressure sensor is provided that includes a diaphragm, a coupling portion, which is coupled to the diaphragm, and two pressure receiving elements. Each of the pressure receiving elements has a pressure receiving surface and outputs an output signal that changes according to a temperature and a pressure applied to the pressure receiving surface. Each of the pressure receiving elements has an output characteristic that represents a relationship of the output signal to the pressure and the temperature. The output characteristics of the two pressure receiving elements are the same. The pressure receiving surface of one of the pressure receiving elements is connected to the diaphragm through the coupling portion, and the pressure receiving surface of the other one of the pressure receiving elements is disconnected from the diaphragm. The pressure sensor outputs a signal that is in accordance with a difference between the output signals of the two pressure receiving elements.

DETAILED DESCRIPTION OF THE PREFERRED EMBODIMENTS

Referring to FIGS. 1 to 6, a cylinder pressure sensor according to one embodiment will now be described.

Figure 1:
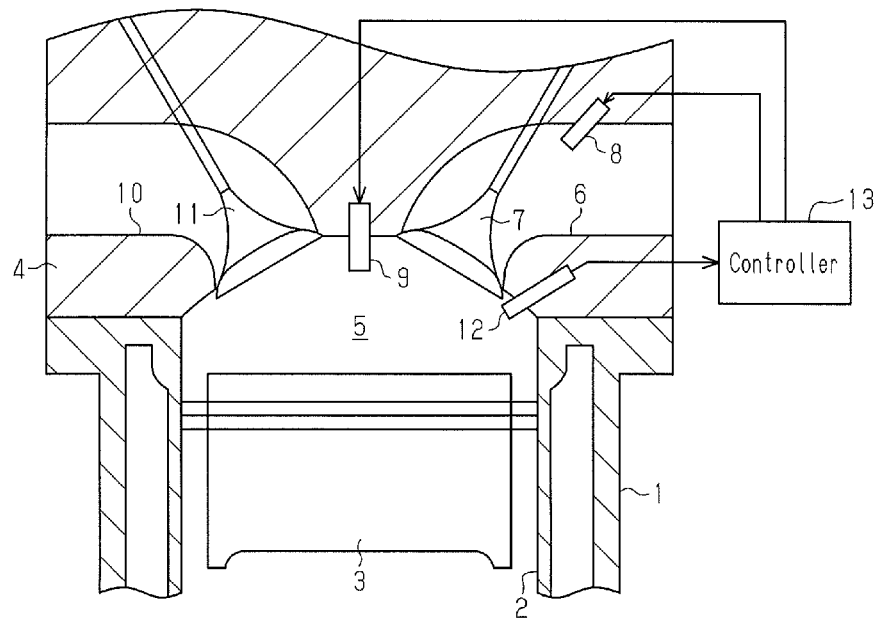
FIG. 1 is a cross-sectional view showing the structure of an internal combustion engine that includes a cylinder pressure sensor according to one embodiment.

As shown in FIG. 1, a cylinder pressure sensor 12 is installed in a cylinder block 1 of an internal combustion engine, which includes a cylinder 2. A piston 3 is reciprocally accommodated in the cylinder 2. A cylinder head 4 is fixed to the upper section of the cylinder block 1. The cylinder head 4, the cylinder 2, and the piston 3 define a combustion chamber 5. The cylinder head 4 includes an intake port 6, which introduces intake air into the combustion chamber 5. An intake valve 7 is located in the intake port 6 to allow and prevent communication between the intake port 6 and the combustion chamber 5. Further, a fuel injection valve 8 is located in the intake port 6 to inject fuel into the intake port 6.

The cylinder head 4 includes a spark plug 9, which ignites the mixture gas of intake air and the fuel injected by the fuel injection valve 8 in the combustion chamber 5. After burning in the combustion chamber 5, the burned gas is discharged as exhaust air through an exhaust port 10, which is located in the cylinder head 4. An exhaust valve 11 is located in the exhaust port 10 to allow and prevent communication between the exhaust port 10 and the combustion chamber 5.

The cylinder pressure sensor 12 is located in the cylinder head 4 to detect the pressure in the combustion chamber 5.

The internal combustion engine includes a controller 13, which receives output signals from various sensors including the cylinder pressure sensor 12. Based on such signals, the controller 13 controls the amount of fuel injected by the fuel injection valve 8 and the ignition timing of the spark plug 9, for example.

Figure 2:
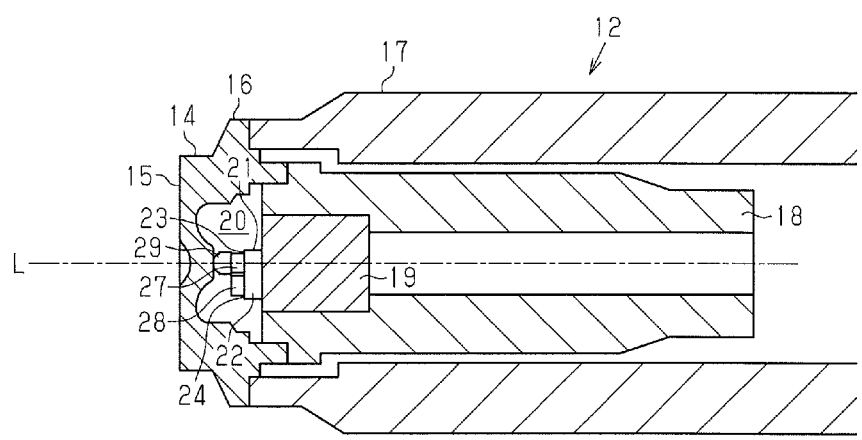
FIG. 2 is an enlarged cross-sectional view showing the distal end of the cylinder pressure sensor of the embodiment.
Figure 3:
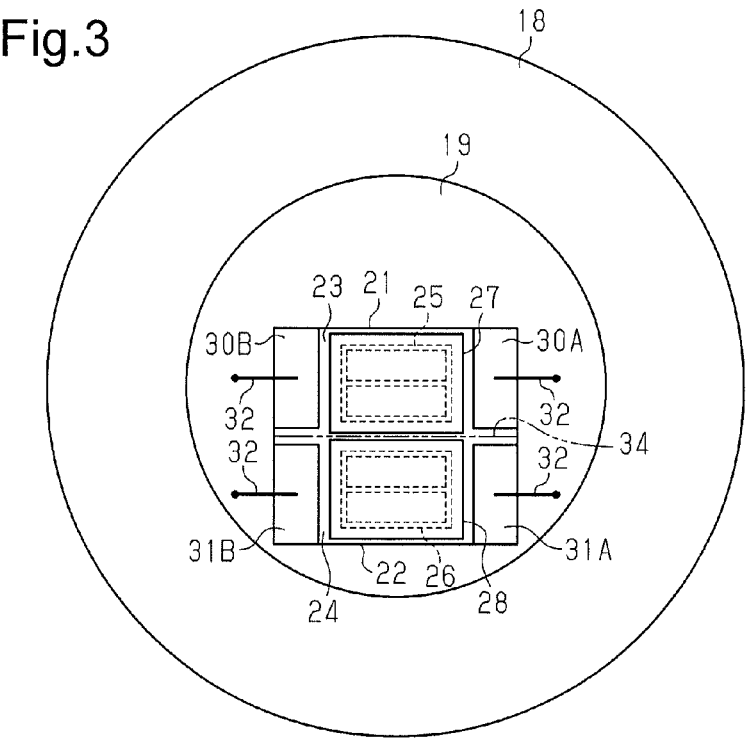
FIG. 3 is a schematic diagram of the structure of pressure receiving elements of the cylinder pressure sensor of the embodiment, as viewed from the side corresponding to the pressure receiving surface.

Referring to FIGS. 2 and 3, the structure of the cylinder pressure sensor 12 will now be described.

As shown in FIG. 2, the distal end of the cylinder pressure sensor 12 includes a diaphragm 14, which is made of metal, for example. The diaphragm 14 is tubular and has a closed end section 15, to which the pressure in the combustion chamber 5 is applied. The center of the end section 15 of the diaphragm 14 is curved. The pressure applied to the end section 15 deforms the diaphragm 14.

The diaphragm 14 includes a flange 16 that extends radially outward of the other section of the diaphragm 14. The flange 16 extends along the entire circumference of the diaphragm 14. The diaphragm 14 is fixed to a tubular outer housing 17 with the flange 16 in contact with the distal end of the outer housing 17.

The outer housing 17 accommodates a tubular inner housing 18, which is fixed to the diaphragm 14. A sealing member 19 is located in the inner housing 18 to seal the opening of the inner housing 18 that faces the diaphragm 14. This opening is closer to the combustion chamber 5 than the opposite opening and is located on the left side as viewed in FIG. 2. The space in the diaphragm 14 is thus sealed. The distal end of the cylinder pressure sensor 12 includes an accommodation space 20, which is separated from the outside of the cylinder pressure sensor 12 by the diaphragm 14.

Two pressure receiving elements 21 and 22 are located in the accommodation space 20 and fixed to the sealing member 19. The two pressure receiving elements 21 and 22 are semiconductor devices that are made to be adjacent to each other on the same silicon wafer.

As shown in FIGS. 2 and 3, each of the pressure receiving elements 21 and 22 has the shape of a cuboid. The two pressure receiving elements 21 and 22 are cut out as a single piece with long sides in a cross-section that are parallel to the pressure receiving surfaces 23 and 24 in contact with each other along their entire lengths. Each of the pressure receiving elements 21 and 22 includes a region that electrically insulates the pressure receiving elements 21 and 22 from each other. The pressure receiving surfaces 23 and 24 are located on the left sides of the pressure receiving elements 21 and 22 as viewed in FIG. 2 and located on the front sides of the pressure receiving elements 21 and 22 as viewed in FIG. 3. The two pressure receiving elements 21 and 22 are adjacent to each other and arranged side by side.

The pressure receiving elements 21 and 22 are elongated as viewed in the plan view of FIG. 3. The two pressure receiving elements 21 and 22 are arranged side by side with long sides 34 in contact with each other along their entire lengths as viewed in the plan view of FIG. 3.

In this specification, the phrase "in contact with each other" refers to a state in which the two pressure receiving elements 21 and 22 are positioned with no gap between the elements 21 and 22. Thus, the state of being "in contact with each other" includes a state in which the two pressure receiving elements 21 and 22 are made on the same silicon wafer as well as a state in which two pressure receiving elements are physically separate from each other and arranged side by side.

The pressure receiving elements 21 and 22 output voltages as output signals that change according to the temperature and the pressure applied to the pressure receiving surfaces 23 and 24. Each of the pressure receiving elements 21 and 22 has an output characteristic that represents the relationship of a voltage to a pressure and a temperature. The two pressure receiving elements 21 and 22 have the same output characteristics.

Of the two pressure receiving elements 21 and 22, the pressure receiving element 21 intersects an axis L of the diaphragm 14, and the pressure receiving element 22 does not intersect the axis L of the diaphragm 14.

Gauge sections 25 and 26 are respectively located on the pressure receiving surfaces 23 and 24 of the pressure receiving elements 21 and 22. Glass blocks 27 and 28 are coupled to and cover the gauge sections 25 and 26, respectively. The glass block 27 that is coupled to the pressure receiving element 21 is connected to a rod 29. The rod 29 has a semispherical contact surface, which is connected to the center of the end section 15 of the diaphragm 14. That is, the pressure receiving element 21 is coupled to the glass block 27, which is connected to the diaphragm 14 through the rod 29. The pressure receiving surface 23 of the pressure receiving element 21 is connected to the diaphragm 14 through the glass block 27. In other words, the pressure receiving element 21 is connected to the diaphragm 14. More specifically, the pressure receiving element 21 is indirectly connected to the diaphragm 14. The glass block 27 functions as a coupling portion.

The glass block 28, which is coupled to the pressure receiving element 22, is not connected to the rod 29 or the diaphragm 14. The glass block 28 is disconnected from the diaphragm 14. In other words, the pressure receiving element 22 is coupled to the glass block 28, which is not connected to the diaphragm 14. The pressure receiving surface 24 of the pressure receiving element 22 is not connected to the diaphragm 14. That is, the pressure receiving surface 24 of the pressure receiving element 22 is disconnected from the diaphragm 14. The pressure receiving element 21, which is connected to the diaphragm 14, is coupled to the glass block 27, which is connected to the diaphragm 14, and the pressure receiving element 22, which is disconnected from the diaphragm 14, is coupled to the glass block 27, which is disconnected from the diaphragm 14.

In the present embodiment, the pressure receiving element 21, which is connected to the diaphragm 14, serves as one of the pressure receiving elements, and the pressure receiving element 22, which is disconnected from the diaphragm 14, serves as the other one of the pressure receiving elements. To distinguish the pressure receiving element 21 from the pressure receiving element 22, the pressure receiving element 21, which is connected to the diaphragm 14, may be defined as a first pressure receiving element, and the pressure receiving element 22, which is disconnected from the diaphragm 14, may be defined as a second pressure receiving element.

As shown in FIG. 3, the first pressure receiving element 21 includes a pair of electrodes 30A and 30B. The second pressure receiving element 22 includes a pair of electrodes 31A and 31B. The voltage between the electrodes 30A and 30B of the first pressure receiving element 21 and the voltage between the electrodes 31A and 31B of the second pressure receiving element 22 are detected through leads 32 connected to electrodes 30A, 30B, 31A and 31B. The leads 32 are embedded in and extended through the sealing member 19. The cylinder pressure sensor 12 detects the voltages of the two pressure receiving elements 21 and 22 as output signals and outputs a signal in accordance with the difference between the voltages of the pressure receiving elements 21 and 22 to the controller 13. A known technique may be used to output a signal in accordance with the difference between the voltages of the two pressure receiving elements 21 and 22. For example, an operational amplifier may be used to output a signal in accordance with the difference between voltages.

Operation of the present embodiment will be described with reference to FIGS. 4 to 6.

The two pressure receiving elements 21 and 22 of the cylinder pressure sensor 12 output voltages that change according to the pressures applied to the pressure receiving surfaces 23 and 24. The higher the pressures applied to the pressure receiving surfaces 23 and 24, the higher the voltages become. The two pressure receiving elements 21 and 22 are made to be adjacent to each other on the same wafer. The difference in output characteristic between the pressure receiving elements 21 and 22, which are made from the same wafer, is smaller than the difference in output characteristic between pressure receiving elements that are made from separate wafers.

Figure 4:
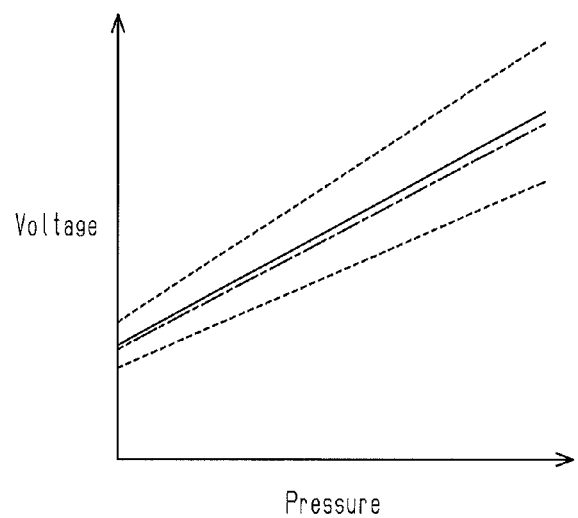
FIG. 4 is a graph showing the relationship between the voltage and the pressure applied to the pressure receiving surface of each pressure receiving element of the cylinder pressure sensor of the embodiment.

FIG. 4 shows, within the detectable pressure range, the output characteristic that represents the relationship between the pressure and the voltage of the first pressure receiving element 21 in the solid line, the output characteristic that represents the relationship between the pressure and the voltage of the second pressure receiving element 22 in the long dashed short dashed line, and a range of ±20% of the output characteristic of the first pressure receiving element 21 in the broken lines.

As shown in FIG. 4, within the detectable pressure range, the output characteristic of the second pressure receiving element 22 is within the range of ±20% of the output characteristic of the first pressure receiving element 21.

The voltages of the pressure receiving elements 21 and 22 are also influenced by the temperature. That is, the higher the temperatures of the pressure receiving elements 21 and 22, the higher or lower the voltages become. FIG. 5 shows a case where the higher the temperatures of the pressure receiving elements 21 and 22, the higher the voltages become. FIG. 5 shows, within the permissible temperature range, the output characteristic that represents the relationship between the temperature and the voltage of the first pressure receiving element 21 in the solid line, the output characteristic that represents the relationship between temperature and voltage of the second pressure receiving element 22 in the long dashed short dashed line, and a range of ±20% of the output characteristic of the first pressure receiving element 21 in the broken lines.

Figure 5:
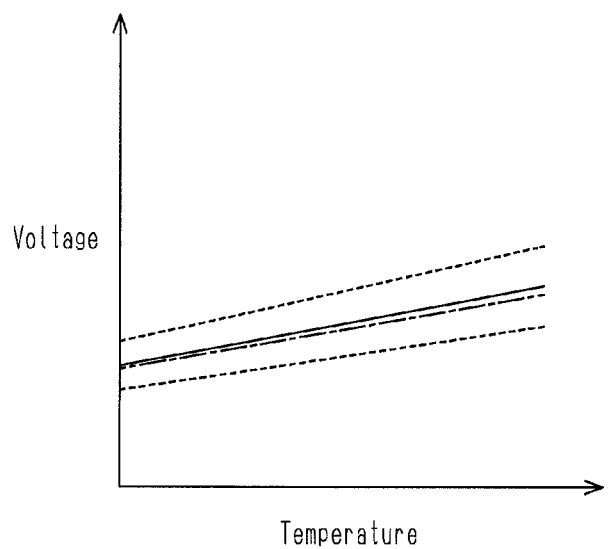
FIG. 5 is a graph showing the relationship between the voltage and the temperature of each pressure receiving element of the cylinder pressure sensor of the embodiment.

As shown in FIG. 5, within the permissible temperature range, the output characteristic of the second pressure receiving element 22 is within the range of ±20% of the output characteristic of the first pressure receiving element 21.

In the present embodiment, the output characteristics of the pressure receiving elements 21 and 22 are defined to be the same when the output characteristic of the second pressure receiving element 22 is within the range of ±20% of the output characteristic of the first pressure receiving element 21 for the detectable pressure range, and the output characteristic of the second pressure receiving element 22 is within a range of ±20% of the output characteristic of the first pressure receiving element 21 for the permissible temperature range.

As such, the output characteristic of the first pressure receiving element 21 is the same as the output characteristic of the second pressure receiving element 22. Accordingly, for the same pressure and the same temperature, the voltages of the pressure receiving elements 21 and 22 are substantially the same. In addition, the voltages of the pressure receiving elements 21 and 22 change in the same manner according to the pressure and the temperature.

Of the two pressure receiving elements 21 and 22 having the same output characteristics, the glass block 27, which is coupled to the pressure receiving surface 23 of the first pressure receiving element 21, is connected to the diaphragm 14 through the rod 29. The glass block 28, which is coupled to the pressure receiving surface 24 of the second pressure receiving element 22, is not connected to the rod 29. The glass block 28 is not connected to the diaphragm 14. The glass block 28 is disconnected from the diaphragm 14.

Figure 6:
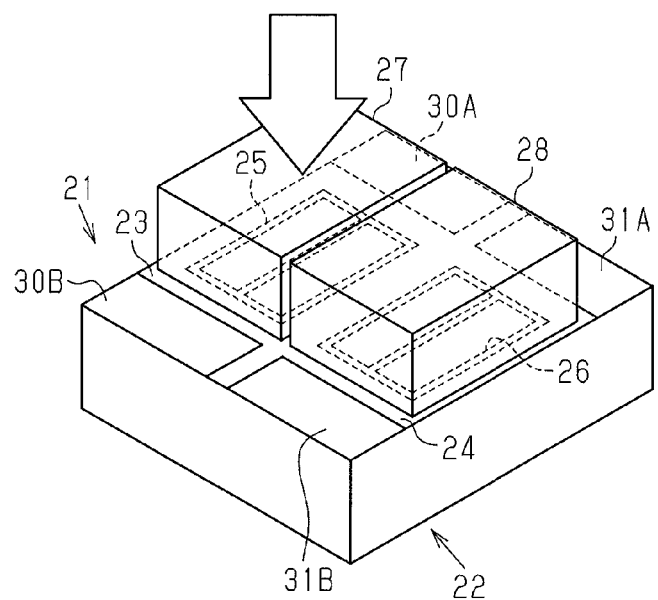
FIG. 6 is a perspective view schematically showing the pressure applied to the pressure receiving elements when a pressure is applied to the diaphragm of the cylinder pressure sensor of the embodiment.

Consequently, as indicated by the arrow in FIG. 6, deformation of the diaphragm 14 caused by the pressure in the combustion chamber 5 applies pressure only to the first pressure receiving element 21 through the rod 29 and the glass block 27. Thus, the first pressure receiving element 21 outputs a voltage that is influenced by the pressure and the temperature, and the second pressure receiving element 22 outputs a voltage that is influenced only by the temperature. Since the voltages of the pressure receiving elements 21 and 22 are influenced equally by the temperature, the difference between the voltage of the first pressure receiving element 21 and the voltage of the second pressure receiving element 22 is only influenced by the pressure.

The present embodiment outputs a signal that is in accordance with the difference between the output signal of the first pressure receiving element 21 and the output signal of the second pressure receiving element 22. That is, the present embodiment eliminates the influence of the temperature and outputs a signal that is influenced only by the pressure. This allows for detection of the pressure applied to the diaphragm 14 without performing a compensation operation on a signal using a compensation factor.

To accurately eliminate the influences of the temperature on the voltage of the first pressure receiving element 21, to which the pressure applied to the diaphragm 14 is transmitted, by using the voltage of the second pressure receiving element 22, to which the pressure applied to the diaphragm 14 is not transmitted, it is desirable that the two pressure receiving elements 21 and 22 be at the same temperature.

The two pressure receiving elements 21 and 22 of the present embodiment are in the accommodation space 20, which is separated from the outside of the cylinder pressure sensor 12 by the diaphragm 14. Thus, the temperatures of the two pressure receiving elements 21 and 22 are close to each other as compared to a structure in which the first pressure receiving element 21 is in the accommodation space 20 but the second pressure receiving element 22 is not in the accommodation space 20.

Further, since the two pressure receiving elements 21 and 22 are adjacent to each other, the temperatures of the pressure receiving elements 21 and 22 are further closer to each other.

In a pressure sensor that detects the pressure applied to the diaphragm 14 by transmitting the pressure to the first pressure receiving element 21, such as the cylinder pressure sensor 12 of the present embodiment, the first pressure receiving element 21 is placed in the accommodation space 20, which is separated from the outside of the cylinder pressure sensor 12 by the diaphragm 14. Thus, placing the two pressure receiving elements 21 and 22 in the accommodation space 20, which is separated from the outside of the cylinder pressure sensor 12 by the diaphragm 14, eliminates the need for providing additional space for the second pressure receiving element 22, which is disconnected from the diaphragm 14. This limits enlargement of the pressure sensor, which would otherwise be caused by having two pressure receiving elements.

As described above, to accurately eliminate the influences of temperature from the voltage of the first pressure receiving element 21, to which the pressure applied to the diaphragm 14 is transmitted, by using the voltage of the second pressure receiving element 22, to which the pressure applied to the diaphragm 14 is not transmitted, it is desirable that the output characteristics of the two pressure receiving elements 21 and 22 be closer to each other.

In manufacturing pressure receiving elements, wafers are individually subjected to various types of processes. The variations in output characteristics among the pressure receiving elements that are made from the same wafer are smaller than the variations in output characteristics among the pressure receiving elements that are made from separate wafers.

In the present embodiment, the two pressure receiving elements 21 and 22 are made from the same wafer. Thus, the output characteristics of the pressure receiving elements 21 and 22 are close to each other.

Further, the two pressure receiving elements 21 and 22 of the present embodiment are made to be adjacent to each other on the same wafer and cut out as a single piece. Thus, the output characteristics of the pressure receiving elements 21 and 22 are closer to each other than if two pressure receiving elements were used that are formed on the same wafer but are spaced apart from each other.

The two pressure receiving elements 21 and 22, each having the shape of a cuboid, are cut out as a single piece with long sides 34 in a cross-section that are parallel to the pressure receiving surfaces 23 and 24 in contact with each other along their entire lengths. This allows the pressure receiving elements 21 and 22 to be placed in the accommodation space 20, which has a dimension shorter than twice the length of the long side 34.

The first pressure receiving element 21 is coupled to the glass block 27, which is connected to the diaphragm 14. The second pressure receiving element 22 is coupled to the glass block 28, which is not connected to the diaphragm 14. Thus, the arrangement conditions of the pressure receiving elements 21 and 22 are similar to each other as compared to a structure in which only the first pressure receiving element 21 is coupled to a glass block 27. This renders the temperature changes of the pressure receiving elements 21 and 22 closer to each other.

The above described embodiment achieves the following advantages.

(1) The cylinder pressure sensor 12 includes the two pressure receiving elements 21 and 22, which have the same output characteristics. Of the two pressure receiving elements 21 and 22, the pressure receiving surface 23 of the first pressure receiving element 21 is connected to the diaphragm 14 through the glass block 27, and the pressure receiving surface 24 of the second pressure receiving element 22 is disconnected from the diaphragm 14. Thus, the difference between the voltage of the first pressure receiving element 21 and the voltage of the second pressure receiving element 22 allows for detection of the voltage that is influenced only by the pressure. The pressure applied to the diaphragm 14 is detected by outputting a signal that is in accordance with the difference between the voltage of the first pressure receiving element 21 and the voltage of the second pressure receiving element 22. The detection is achieved without performing a compensation operation on an output signal using a compensation factor that is determined according to the properties of each element to accurately correct a change in the output signal caused by a change in temperature. This eliminates the need for determining and storing a compensation factor for temperature compensation in the manufacturing process of the cylinder pressure sensor 12. The pressure is detectable without storing a compensation factor that is determined according to the properties of each element. Thus, fewer manufacturing steps are required than if compensation factors were stored. This reduces the manufacturing costs.

(2) The two pressure receiving elements 21 and 22 are located in the accommodation space 20, which is separated from the outside of the cylinder pressure sensor 12 by the diaphragm 14. Thus, the temperatures of the pressure receiving elements 21 and 22 of the present embodiment are close to each other as compared to a structure in which the first pressure receiving element 21 is placed in the accommodation space 20 but the second pressure receiving element 22 is not placed in the accommodation space 20. Thus, the influences of temperature on the voltage of the first pressure receiving element 21, which is connected to the diaphragm 14, is accurately eliminated using the voltage of the second pressure receiving element 22, which is disconnected from the diaphragm 14.

(3) The two pressure receiving elements 21 and 22 are adjacent to each other. This allows the temperatures of the pressure receiving elements 21 and 22 to be further closer to each other. Thus, the influences of temperature on the output signal of the first pressure receiving element 21, which is connected to the diaphragm 14, is more accurately eliminated using the voltage of the second pressure receiving element 22, which is disconnected from the diaphragm 14.

(4) The two pressure receiving elements 21 and 22 are made from the same wafer. This allows the output characteristics of the pressure receiving elements 21 and 22 to be closer to each other, enabling accurate detection of the pressure.

(5) The two pressure receiving elements 21 and 22 are made to be adjacent to each other on the same wafer and cut out as a single piece. This allows the output characteristics of the pressure receiving elements 21 and 22 to be closer to each other, improving the accuracy of pressure detection.

(6) Each of the pressure receiving elements 21 and 22 has the shape of a cuboid. The two pressure receiving elements 21 and 22 are arranged side by side with long sides 34 in a cross-section that are parallel to the pressure receiving surfaces 23 and 24 in contact with each other along their entire lengths. This allows the pressure receiving elements 21 and 22 to be placed in the accommodation space 20, which has a dimension that is shorter than twice the length of the long side 34, and thus facilitates the installation of the pressure receiving elements 21 and 22.

(7) The first pressure receiving element 21, which is connected to the diaphragm 14, is coupled to the glass block 27, which is connected to the diaphragm 14. The second pressure receiving element 22, which is disconnected from the diaphragm 14 is coupled to the glass block 28, which is disconnected from the diaphragm 14. This allows the changes in temperatures of the two pressure receiving elements 21 and 22 to be closer to each other, thereby achieving accurate pressure detection.

The above described embodiment may be modified as follows.

Figure 7:
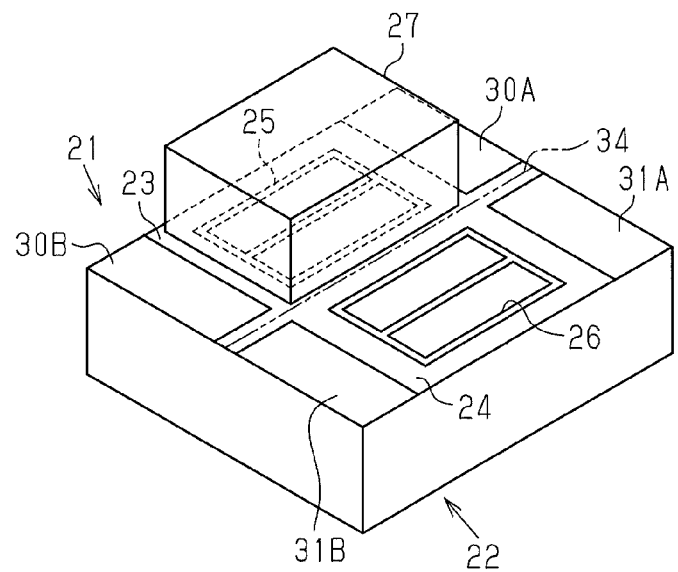
FIG. 7 is a perspective view showing the structure of pressure receiving elements of a cylinder pressure sensor of another embodiment.

The arrangement of the glass blocks 27 and 28 on the pressure receiving elements 21 and 22 may be changed. For example, FIG. 7 shows a structure in which the first pressure receiving element 21 is coupled to the glass block 27 but the second pressure receiving element 22 is not coupled to the glass block 28. Such an arrangement still achieves a structure in which the pressure receiving surface 23 of the first pressure receiving element 21 is connected to the diaphragm 14 and the pressure receiving surface 24 of the second pressure receiving element 22 is disconnected from the diaphragm 14.

The pressure receiving elements 21 and 22 may be cut out separately from the same wafer. In such a structure, it is desirable that the two pressure receiving elements 21 and 22 be arranged side by side with long sides 34 in a cross-section that are parallel to the pressure receiving surfaces 23 and 24 in contact with each other along their entire lengths. In other words, it is desirable that the two pressure receiving elements 21 and 22 be arranged side by side with long sides 34 of the pressure receiving elements 21 and 22 as viewed in a plan view in contact with each other along the entire length. In this case, the two independent pressure receiving elements 21 and 22 are positioned as shown in FIG. 3. The line formed by the long sides 34 is a boundary at which the two physically independent pressure receiving elements 21 and 22 are in contact with each other.

Figure 8:
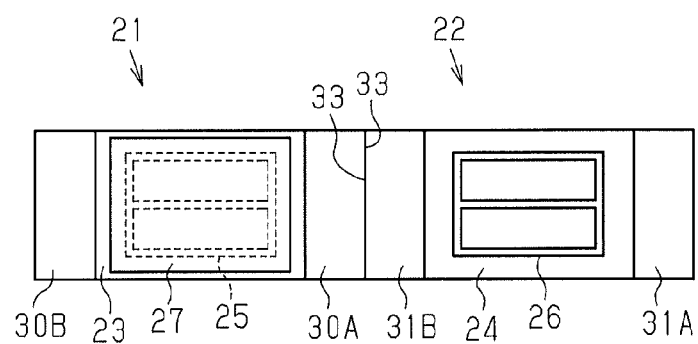
FIG. 8 is a schematic diagram showing the structure of pressure receiving elements of a cylinder pressure sensor of a further embodiment, as viewed from the side corresponding to the pressure receiving surface.

The arrangement of the two pressure receiving elements 21 and 22 may be changed. For example, as shown in FIG. 8, two pressure receiving elements 21 and 22, each having the shape of a cuboid, may be cut out separately and arranged side by side with short sides 33 in a cross-section that are parallel to the pressure receiving surfaces 23 and 24 in contact with each other along their entire lengths. That is, the pressure receiving elements 21 and 22 are elongated as viewed in a plan view and arranged side by side with short sides 33 as viewed in a plan view in contact with each other along their entire lengths. To place such pressure receiving elements 21 and 22 in the accommodation space 20 of the cylinder pressure sensor 12, the accommodation space 20 needs to have a dimension that is at least twice the length of the long sides 34.

The pressure receiving elements 21 and 22 may be two pressure receiving elements that are spaced apart from each other on the same wafer.

The pressure receiving elements 21 and 22 may be two pressure receiving elements that are made from separate wafers.

The pressure receiving elements 21 and 22 may be spaced apart from each other in the accommodation space 20.

Of the two pressure receiving elements 21 and 22, the first pressure receiving element 21 may be placed in the accommodation space 20, which is separated from the outside of the cylinder pressure sensor 12 by the diaphragm 14, and the second pressure receiving element 22 may be placed in a position other than in the accommodation space 20, such as in the inner housing 18. Such a structure still allows the pressure to be detected by outputting a signal that is in accordance with the difference between the voltage of the first pressure receiving element 21 and the voltage of the second pressure receiving element 22. If the pressure receiving elements 21 and 22 differ in temperature due to the distance between the pressure receiving elements 21 and 22, a temperature compensation operation may be performed on the signal that is in accordance with the difference between the voltage of the first pressure receiving element 21 and the voltage of the second pressure receiving element 22. That is, a compensation operation may be performed according to the distance between the pressure receiving elements 21 and 22 so that the signal that corresponds to the difference in voltage between adjacent pressure receiving elements is output. In this structure, accurate pressure detection can be achieved simply by storing the compensation factor that is determined by the distance between the pressure receiving elements. The pressure is detected without storing a compensation factor determined according to the properties of each element.

The rod 29 may be omitted, and the glass block 27 may be directly connected to the diaphragm 14.

The coupling portion may be other than a glass block. Nonetheless, a glass block, which is equivalent to the silicon pressure receiving elements in linear expansion coefficient, is desirable.

The structure of the present embodiment is applicable to pressure sensors other than the cylinder pressure sensor 12.

The invention claimed is:

1. A pressure sensor comprising:
a diaphragm;
a coupling portion, which is coupled to the diaphragm; and
two pressure receiving elements, wherein
each of the pressure receiving elements has a pressure receiving surface and outputs an output signal that changes according to a temperature and a pressure applied to the pressure receiving surface,
each of the pressure receiving elements has an output characteristic that represents a relationship of the output signal to the pressure and the temperature,
the output characteristics of the two pressure receiving elements are the same,
the two pressure receiving elements are located in the same accommodation space that is separated from the outside of the pressure sensor by the diaphragm,
the pressure receiving surface of one of the pressure receiving elements is connected to the diaphragm through the coupling portion, and the pressure receiving surface of the other one of the pressure receiving elements is disconnected from the diaphragm, and
the pressure sensor outputs a signal that is in accordance with a difference between the output signals of the two pressure receiving elements.

2. The pressure sensor according to claim 1, wherein the two pressure receiving elements are adjacent to each other and arranged side by side.

3. The pressure sensor according to claim 2, wherein
each of the pressure receiving elements has a shape of a cuboid, and
the two pressure receiving elements are arranged side by side with long sides as viewed in a plan view of the pressure receiving elements in contact with each other along their entire lengths.

4. The pressure sensor according to claim 3, wherein
the pressure receiving element that is connected to the diaphragm is coupled to a glass block that serves as the coupling portion and is connected to the diaphragm, and
the pressure receiving element that is disconnected from the diaphragm is coupled to another glass block that is disconnected from the diaphragm.

5. The pressure sensor according to claim 2, wherein
the pressure receiving element that is connected to the diaphragm is coupled to a glass block that serves as the coupling portion and is connected to the diaphragm, and
the pressure receiving element that is disconnected from the diaphragm is coupled to another glass block that is disconnected from the diaphragm.

6. The pressure sensor according to claim 1, wherein the two pressure receiving elements are made from the same wafer.

7. The pressure sensor according to claim 6, wherein the two pressure receiving elements are made to be adjacent to each other on the same wafer and cut out as a single piece.

8. The pressure sensor according to claim 7, wherein
the pressure receiving element that is connected to the diaphragm is coupled to a glass block that serves as the coupling portion and is connected to the diaphragm, and
the pressure receiving element that is disconnected from the diaphragm is coupled to another glass block that is disconnected from the diaphragm.

9. The pressure sensor according to claim 3, wherein
the pressure receiving element that is connected to the diaphragm is coupled to a glass block that serves as the coupling portion and is connected to the diaphragm, and
the pressure receiving element that is disconnected from the diaphragm is coupled to another glass block that is disconnected from the diaphragm.

10. The pressure sensor according to claim 1, wherein
the pressure receiving element that is connected to the diaphragm is coupled to a glass block that serves as the coupling portion and is connected to the diaphragm, and
the pressure receiving element that is disconnected from the diaphragm is coupled to another glass block that is disconnected from the diaphragm.

\* \* \* \* \*